US008751919B2

(12) United States Patent
Albornoz et al.

(10) Patent No.: US 8,751,919 B2
(45) Date of Patent: Jun. 10, 2014

(54) CREATION AND RETRIEVAL OF GLOBAL ANNOTATIONS

(75) Inventors: Jordi Albornoz, Cambridge, MA (US); Avijit Chatterjee, White Plains, NY (US); Lee D. Feigenbaum, Brookline, MA (US); Sean J. Martin, Cambridge, MA (US); Lonnie A. McCullough, Houston, TX (US); Herschel J. R. Weintraub, Peoria, AZ (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 12/685,566

(22) Filed: Jan. 11, 2010

(65) Prior Publication Data

US 2010/0115393 A1 May 6, 2010

Related U.S. Application Data

(63) Continuation of application No. 10/803,619, filed on Mar. 18, 2004, now Pat. No. 7,669,117.

(51) Int. Cl.
*G06F 17/00* (2006.01)
*G06F 17/11* (2006.01)

(52) U.S. Cl.
USPC ........... 715/230; 715/512; 715/733; 715/760; 715/839; 715/808; 345/173; 345/634; 345/629; 345/179

(58) Field of Classification Search
USPC ........ 715/230, 512, 205, 571, 733, 513, 524, 715/738, 760, 123, 255, 201, 802, 210, 808, 715/839, 233, 751, 753
See application file for complete search history.

(56) References Cited

U.S. PATENT DOCUMENTS

| 5,559,942 | A | 9/1996 | Gough et al. |
| 5,999,182 | A | 12/1999 | Etchemendy et al. |
| 6,484,156 | B1 * | 11/2002 | Gupta et al. .................. 707/802 |
| 6,519,603 | B1 | 2/2003 | Bays et al. |
| 6,571,295 | B1 | 5/2003 | Sidana |
| 6,687,878 | B1 | 2/2004 | Eintracht et al. |
| 6,871,318 | B1 | 3/2005 | Wynblatt et al. |
| 6,877,137 | B1 * | 4/2005 | Rivette et al. ................. 715/230 |
| 6,956,593 | B1 | 10/2005 | Gupta et al. |
| 6,996,558 | B2 | 2/2006 | Dettinger et al. |

(Continued)

FOREIGN PATENT DOCUMENTS

| EP | 0902379 | 3/1999 |
| EP | 1174801 | 1/2002 |

OTHER PUBLICATIONS

Kahan, et al., "Annotea: An Open RDF Infrastructure for Shared Web Annotations," Computer Networks 39 (2002), pp. 589-608.

(Continued)

*Primary Examiner* — Amy Ng
*Assistant Examiner* — Toan Vu
(74) *Attorney, Agent, or Firm* — Patterson & Sheridan LLP

(57) ABSTRACT

Methods, systems, and articles of manufacture for managing global annotations made for data elements that may be instantiated (e.g., displayed) by a variety of different type applications are provided. By anchoring the global annotations to the data element, rather than the particular data source containing the data element at the time the data element was annotated, the annotation may be retrieved from any application that instantiates or displays it.

9 Claims, 9 Drawing Sheets

(56) References Cited

U.S. PATENT DOCUMENTS

| | | | |
|---|---|---|---|
| 7,392,267 | B2 | 6/2008 | Cragun et al. |
| 7,493,559 | B1* | 2/2009 | Wolff et al. ............ 715/727 |
| 7,669,117 | B2 | 2/2010 | Albornoz et al. |
| 2001/0051958 | A1* | 12/2001 | deVries et al. ............ 707/511 |
| 2002/0030683 | A1* | 3/2002 | Alexander ............ 345/440.1 |
| 2003/0018666 | A1 | 1/2003 | Chen et al. |
| 2003/0145310 | A1 | 7/2003 | Thames et al. |
| 2003/0196164 | A1 | 10/2003 | Gupta et al. |
| 2004/0138946 | A1* | 7/2004 | Stolze ............ 705/14 |
| 2004/0150669 | A1 | 8/2004 | Sabiers et al. |
| 2004/0163042 | A1 | 8/2004 | Altman |
| 2004/0205542 | A1* | 10/2004 | Bargeron et al. ............ 715/512 |
| 2004/0205545 | A1* | 10/2004 | Bargeron et al. ............ 715/512 |
| 2004/0260714 | A1 | 12/2004 | Chatterjee et al. |
| 2004/0261016 | A1* | 12/2004 | Glass et al. ............ 715/512 |
| 2005/0065958 | A1* | 3/2005 | Dettinger et al. ............ 707/102 |
| 2005/0081159 | A1* | 4/2005 | Gupta et al. ............ 715/751 |
| 2005/0160357 | A1 | 7/2005 | Rivette et al. |
| 2006/0143559 | A1* | 6/2006 | Spielberg et al. ............ 715/512 |
| 2006/0212795 | A1* | 9/2006 | Cottrille et al. ............ 715/512 |

OTHER PUBLICATIONS

Bargeron, et al., "Robustly Anchoring Annotations Using Keywords," Nov. 16, 2001, Retrieved From http://research.microsoft.com/research/pubs/view/aspx?type=technical%report&id=522>.

Non-Final Office Action for U.S. Appl. No. 10/803,619, Dated May 30, 2007.

Final Office Action for U.S. Appl. No. 10/803,619, Dated Apr. 8, 2008.

Non-Final Office Action for U.S. Appl. No. 10/803,619, Dated Mar. 5, 2009.

Barghouti, Naser et al., Improvise—A process modeling interface with multimedia graph diagrams (Background and Overview), Electronic Proceedings of the ACM Workshop on Effective Abstractions in Multimedia: Layout, Presentation, and Interaction, Oct. 1995, ACM, New York, New York, United States.

Electrical Schematics Page, Jefferson Lab: Exploring the Nature of Matter, Apr. 25, 2002, retrieved Oct. 14, 2006, <https://www.jlab.org/accel/inj_group/elec1.htm>.

* cited by examiner

CREATION AND RETRIEVAL OF GLOBAL ANNOTATIONS

CROSS-REFERENCE TO RELATED APPLICATIONS

This application is a continuation of application Ser. No. 10/803,619, filed on Mar. 18, 2004, issued as U.S. Pat. No. 7,669,117. The present application is also related to commonly-owned U.S. Pat. No. 6,519,603, entitled "Method And System For Organizing An Annotation Structure And For Querying Data And Annotations" and commonly owned, co-pending application Ser. No. 10/600,014, entitled "Universal Annotation Management System", which are herein incorporated by reference.

BACKGROUND OF THE INVENTION

1. Field of the Invention

The present invention relates to the field of data entry and retrieval and, more particularly, to a method and system for anchoring annotations to data elements, such that the annotations may be retrieved and viewed from any type of application capable of instantiating the data element, regardless of the application from which the annotation was created.

2. Description of the Related Art

There are well known methods for capturing and storing explicit knowledge as data, for example, in relational databases, documents, flat files, and various proprietary formats in binary files. Often, such data is analyzed by various parties (e.g., experts, technicians, managers, etc.), resulting in rich interpretive information, commonly referred to as tacit knowledge. However, such tacit knowledge is often only temporarily captured, for example, as cryptic notes in a lab notebook, discussions/conversations, presentations, instant messaging exchanges, e-mails and the like. Because this tacit knowledge is typically not captured in the application environment in which the related data is viewed and analyzed, it is often lost.

One approach to more permanently capture tacit knowledge is to create annotations containing descriptive information about data objects. Practically any identifiable type of object may be annotated, such as a matrix of data (e.g., a spreadsheet or database table), a text document, or an image. Further, subportions of objects (sub-objects) may be annotated, such as a cell, row, or column in a database table or a section, paragraph, or word in a text document. An indexing scheme is typically used to map each annotation to the annotated data object or sub-object, based on identifying information, typically in the form of an index. The index should provide enough specificity to allow the indexing scheme to locate the annotated data object (or sub-object). Further, to be effective, the indexing scheme should work both ways: given an index, the indexing scheme must be able to locate the annotated data object and, given an object, the indexing scheme must be able to calculate the index for use in classification, comparison, and searching (e.g., to search for annotations for a given data object).

Typically, the index refers to a particular data source in which an annotated data element is instantiated (e.g., a document, spreadsheet, database table, or the like). Thus, using the index, the annotation can be retrieved from the application used to display the data source containing the annotated data element. However, some data elements may be displayed (or otherwise instantiated) in a variety of different type (i.e., heterogeneous) application programs, which is a fairly common scenario in modern business enterprises. For example, in a biomedical enterprise, a single data element, such as a gene name, may occur in text documents (manipulated by a word processor/text editor), experimental data (manipulated by a database or spreadsheet application), genomic data (manipulated by a specialized application), images (manipulated by an image viewing application), and the like. In many cases, an annotation made for the data element may be valid regardless of the application in which it is instantiated. In such cases, it would be desirable to allow the annotation to be "anchored" to the data element, such that the annotation could be retrieved and viewed from any application in which it is being viewed.

Accordingly, there is a need for methods and systems for creating "global annotations" anchored to the data elements they describe, such that the global annotations may be retrieved and viewed from any application displaying the data elements.

SUMMARY OF THE INVENTION

The present invention generally is directed to methods, systems, and articles of manufacture for managing global annotations anchored to data elements which may be contained in a variety of different type data sources loaded by a variety of different applications.

One embodiment provides a method for exchanging information between entities on a network. The method generally includes identifying a plurality of data elements capable of being manipulated by a plurality of applications on the network and to which global annotations may be anchored, providing one or more interfaces for creating global annotations anchored to selected annotatable data elements from at least a first one of the applications, and providing one or more interfaces for viewing, from at least a second application, global annotations created from the first application.

Another embodiment provides a method for creating global annotations. The method generally includes loading a first set of data with a first application, identifying one or more data elements in the first set of data to which global annotations can be anchored, providing an interface allowing a user to create a global annotation for a selected one of the identified data elements, and storing a global annotation created via the interface in an annotation store, wherein the global annotation is anchored to the selected data element.

Another embodiment provides a method for viewing global annotations. The method generally includes loading a first set of data with a first application, identifying one or more data elements in the first set of data to which global annotations have be anchored, providing an indication of the identified data elements, and providing an interface, accessible from the first application, allowing a user to view a global annotation for a selected one of the identified data elements.

Another embodiment provides a computer-readable medium containing an executable component for exchanging information between entities on a network. When executed by a processor, the executable component performs operations generally including identifying a plurality of data elements capable of being manipulated by a plurality of applications on the network and to which global annotations may be anchored, providing one or more graphical user interfaces for creating global annotations anchored to selected annotatable data elements from at least a first one of the applications, and providing one or more graphical user interfaces for viewing, from at least a second application, global annotations created from the first application.

Another embodiment provides a system for managing global annotations anchored to one or more different type data elements. The system generally includes an annotation database for storing the global annotations, one or more applications capable of loading data containing one or more data elements to which one or more global annotations are anchored, a set of plug-in components, each for interfacing between one or more of the applications and an annotation server, and an annotation server. The annotation server is generally configured to receive, via the plug-in components, requests from the applications to access global annotations anchored to one or data elements instantiated by the applications.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
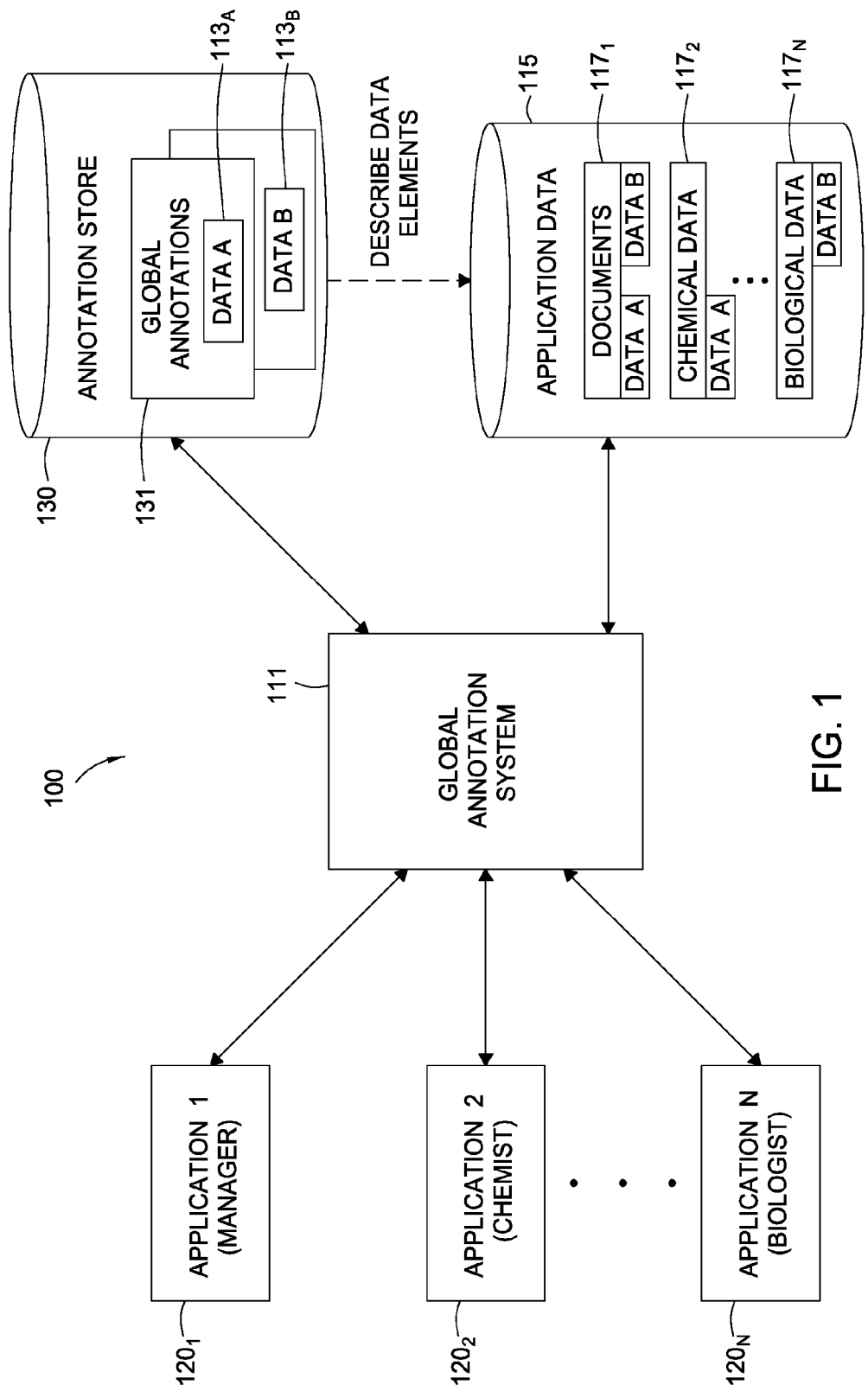
FIG. 1 illustrates an exemplary annotation system in accordance with one embodiment of the present invention.

The present invention provides methods, systems, and articles of manufacture that may be used to manage global annotations made for data elements that may be instantiated (e.g., displayed) by a variety of different type applications. Standard or "document-centered" annotations are associated with (or "anchored" to) specific documents or locations within those documents and, therefore, rely on those documents for context. In contrast, a global or "data-centered" annotation is associated with the data element it describes independent of any particular document. As a result, global annotations may be readily accessible from any variety of applications capable of instantiating the annotated data element, for example, in a loaded document.

Annotations (both real and global) may exist in various forms, including textual annotations (descriptions, revisions, clarifications, comments, instructions, etc.), graphical annotations (pictures, symbols, etc.), sound clips, etc. While an annotation may exist in any or all of these forms, to facilitate understanding, embodiments of the present invention may be described below with reference to textual annotations as a particular, but not limiting, example of an annotation. Accordingly, it should be understood that the following techniques described with reference to textual annotations may also be applied to other types of annotations, as well, and, more generally, to any type of reference to a data object.

As used herein, the term document generally refers to any data source containing data elements that may be annotated including, but not limited to text documents, Adobe Acrobat (*.pdf) documents, spreadsheets, database tables, and the like. Further, as used herein, the term user may generally apply to any entity utilizing the annotation system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

One embodiment of the invention is implemented as a program product for use with a computer system such as, for example, the enterprise system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Environment

FIG. 1 illustrates an exemplary enterprise system 100 in which a global annotation system 111 in accordance with the present invention may be utilized to exchange information, captured in the form of global annotations 131, between users collaborating on a project. For some embodiments, components of the annotation system 111 described herein may operate in a same or similar manner to those described in the commonly owned, co-pending application Ser. No. 10/600,014, entitled "Universal Annotation Management System", and incorporated by reference herein in its entirety. Those skilled in the art will recognize that many of the concepts described herein may be integrated and implemented on that system and that, as will be described in greater detail below, a single system may support both normal or "document-centered" annotations as described in the referenced application and global annotations as described herein.

As previously described, rather than reference a particular document, or location thereof, the global annotations 131 reference the data elements they describe. As a result, a global annotation 131 may be accessed from any application 120 instantiating the data element described thereby, for example, in a document loaded for viewing, even if the global annotation was originally created while viewing another document, possibly with another application 120. In other words, different occurrences of each data element 113 may be contained in a number of different type data sources 117.

As an example, data element $113_A$ (e.g., a gene family name) may occur in both a document $117_1$ and chemical data $117_2$, while another data element $113_B$ may occur in both the document $117_1$ and biological data $117_N$. A global annotation describing the data element $113_A$ may be accessed from application $120_1$ used to display the document $117_1$, application $120_2$ used to display the chemical data $117_2$, or any other application capable of loading a data source containing the chemical data $117_2$. Similarly, a global annotation describing the data element $113_B$ may be accessed from application $120_1$, application $120_N$, or any other application capable of loading a data source containing the chemical data $117_2$.

During the annotation creation process, the user entering the annotation content will typically be interacting with software that could be either embedded within their particular applications (e.g., as a plug-in component) or, alternatively, with a separate annotation application that is external to their applications, for example, a stand-alone browser. In any case, the global annotations 131 may be stored in a central annotation repository (e.g., an annotation store 130), with references to the data elements they describe. Storing the global annotations 131 in the annotation store 130 may allow tacit knowledge to be captured about the data without modifying the data sources containing the data elements to which the global annotations are anchored. For some embodiments, the annotation store 130 may be searched independently of, or in conjunction with, the data sources containing the data elements described by the global annotations 131. Thus, not only can global annotations 131 be accessed from any application capable of instantiating the data elements they describe, they may also be accessed independently of those applications.

Figure 2:
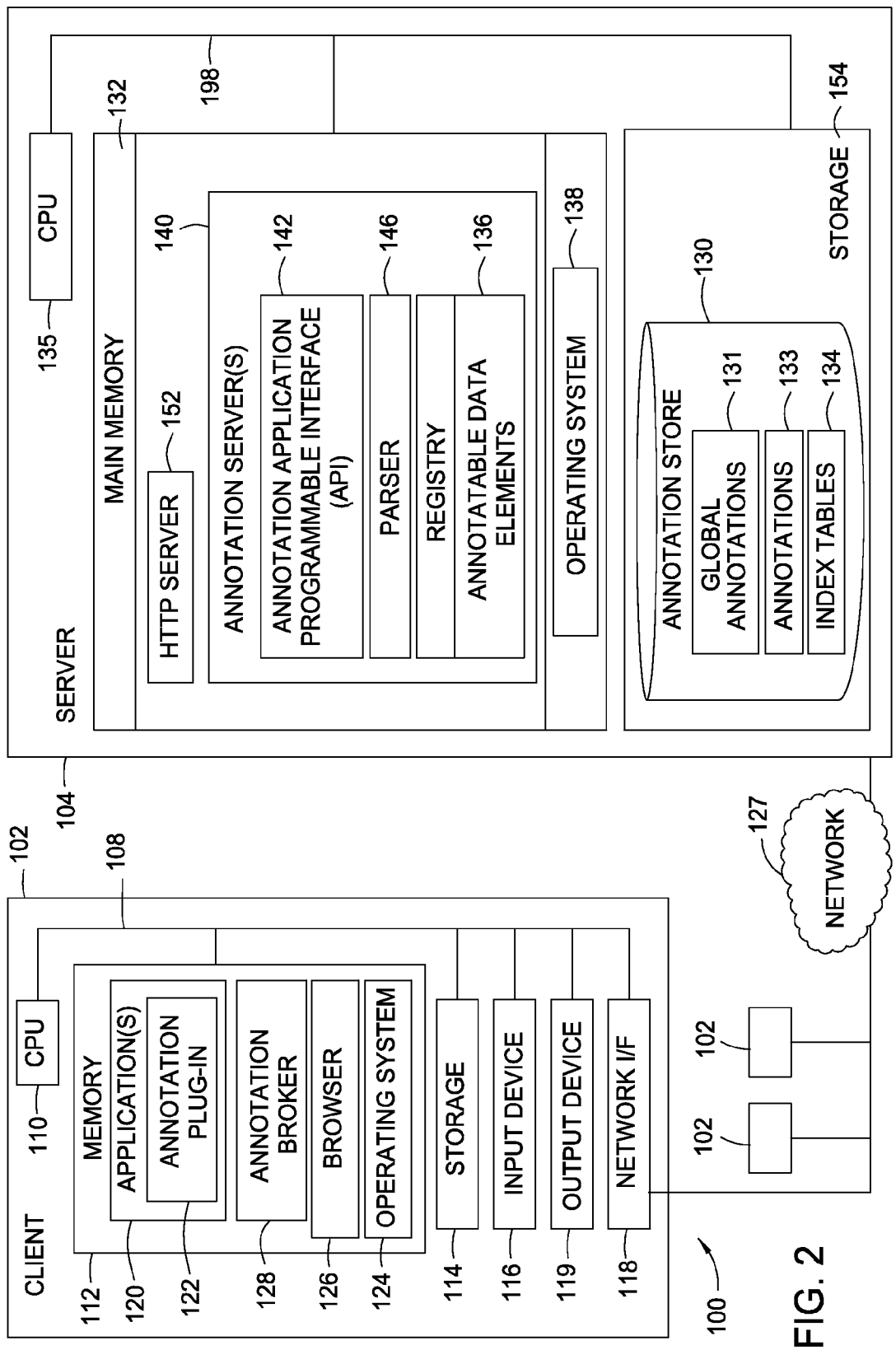
FIG. 2 is an exemplary computing environment in which embodiments of the present invention may be utilized.

Referring now to FIG. 2, a client-server view of one embodiment of the enterprise system 100 is shown. As illustrated, the system 100 generally includes one or more client computers 102 (e.g., user workstations) generally configured to access global annotations 131 in an annotation store 130, via the annotation server 140 (e.g., a software component) running on at least one server computer 104. The client computers 102 and server computer may be connected via a network 127. In general, the network 127 may be any combination of a local area network (LAN), a wide area network (WAN), wireless network, or any other suitable type network, including the Internet.

As illustrated, the client computers 102 generally include a Central Processing Unit (CPU) 110 connected via a bus 108 to a memory 112, storage 114, input devices 116, output devices 119, and a network interface device 118. The input devices 116 may be any devices to give input to the client computer 102, such as a mouse, keyboard, keypad, light-pen, touch-screen, track-ball, or speech recognition unit, audio/video player, and the like. The output devices 119 may be any suitable devices to give output to the user, including speakers and any of various types of display screen. Although shown separately from the input device 116, the output device 119 and input device 116 could be combined (e.g., a display screen with an integrated touch-screen).

The network interface device 118 may be any entry/exit device configured to allow network communications between the client computer 102 and the server computer 104 via the network 127. For example, the network interface device 118 may be a network adapter or other network interface card (NIC). Storage 114 is preferably a Direct Access Storage Device (DASD). Although shown as a single unit, storage 114 may be any combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory (RAM) sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips. Illustratively, the memory 112 contains an operating system 124. Examples of suitable operating systems, which may be used to advantage, include Linux and Microsoft's Windows®, as well as any operating systems designed for handheld devices, such as Palm OS®, Windows® CE, and the like. More generally, any operating system supporting the functions disclosed herein may be used.

The memory 112 is also shown containing at least one application 120 (optionally shown with an associated annotation plug-in 122 and an annotation broker 128). The application 120 may be any of a variety of applications used to manipulate (e.g., create, view, and/or edit) data that may be annotated. For example, the application 120 may be a text editor/ word processor used to manipulate annotatable documents, a database application or spreadsheet used to manipulate data, a document generator/viewer (such as Adobe's Acrobat® and Acrobat Reader) used to manipulate documents, or data analysis software, such as Decision Site available from Spotfire, Inc., imaging software used to manipulate images, and any other types of applications used to manipulate various types and forms of data.

Some application programs 120 may be configured to communicate with the annotation server 140 directly, for example, via a set of application programming interface (API) 142 functions provided for the annotation server 140. As used herein, the term API generally refers to any set of interface functions (e.g., implementing any suitable inter-process protocol) that may be used to communicate between a client computer or process and a server computer or process. Other application programs, however, may communicate with the annotation server 140 via plug-in components 122 and/or the annotation broker 128 (e.g. also via the API 142). In other words, annotation capability may be added to an existing application 120 via the plug-in components 122. The plug-in components 122 may, for example, present graphical user interface (GUI) screens to users of applications 120, thus allowing the creation and retrieval of annotations from within the applications used to manipulate the annotated data.

The annotation broker 128 is an optional component and may be implemented as a software component configured to present a standard interface to the Annotation Server 140 from various applications 120, for example, communicating with plug-in components 122 from multiple applications running on the same client computer 102. Hence, the annotation broker 128 may provide a degree of separation between the applications 120 and the annotation server 140, hiding detailed operation of the annotation server 140 and facilitating development of plug-in components 122. In other words, new applications 120 may be supported through the development of plug-in components 122 written in accordance with the annotation broker interface.

Components of the server computer 104 may be physically arranged in a manner similar to those of the client computer 102. For example, the server computer 104 is shown generally comprising a CPU 135, a memory 132, and a storage device 154, coupled to one another by a bus 198, which may all functions as similar components described with reference to the client computer 102. The server computer 104 is generally under the control of an operating system 138 (e.g., IBM OS/400®, UNIX, Microsoft Windows®, and the like) shown residing in memory 132.

As illustrated, the server computer 104 may be configured with the annotation server 140, also shown residing in memory 132. The annotation server 140 provides annotation clients (e.g., running on one or more client computers 102) with access to the annotation store 130, for example, via the annotation API 142. In other words, the annotation API 142 generally defines the interface between annotation clients and the annotation server 140. As used herein, the term annotation client generally refers to any user interface (or other type front-end logic) of the annotation system that communicates with the annotation server to manipulate (e.g., create, update, read and query) annotation data. Examples of annotation clients include applications 120 communicating with the annotation server 140 (directly, or via plug-in components 122) and an annotation browser 126.

As will be described in greater detail below, the annotation server 140 may be configured to perform a variety of operations, such as responding to requests to create annotations for specified data objects, formulating and issuing queries against the annotation store 130 to search for annotations for a specified data object, and formulating and issuing queries against the annotation store 130 to search for annotations satisfying one or more specified conditions (e.g., having a specified author, creation date, content, and the like). As previously described, the annotation server 140 may allow a user to access both global annotation 131 (anchored to data elements) and document-centered annotations 133 (e.g., anchored to documents or locations therein), which may be stored in the same annotation store 130 or separate annotation stores.

For some embodiments, the annotation server 140, and various related components, may be configured via a set of administrative tools 144 (shown in FIG. 2). The administrative tools 144 may be used to create, edit, and modify a registry 136 containing a list of annotatable data elements. For example, the administrative tools 144 may allow users (e.g., administrators) to define new annotatable data elements to be added to the registry 136. The registry 136 may be contain an indication of annotatable data elements and may be organized in any suitable manner, for example, by families or categories of annotatable data elements. In some cases, a parsing component (parser) 146 may receive, from a plug-in component, data loaded by an application 120, parse the data and check the registry 136 for entries that match the parsed data. The parser 146 may then return to the application 120 a list of data elements that are candidates for global annotations (e.g., data elements to which global annotations may be anchored).

A Relational View of the Annotation System

Figure 3:
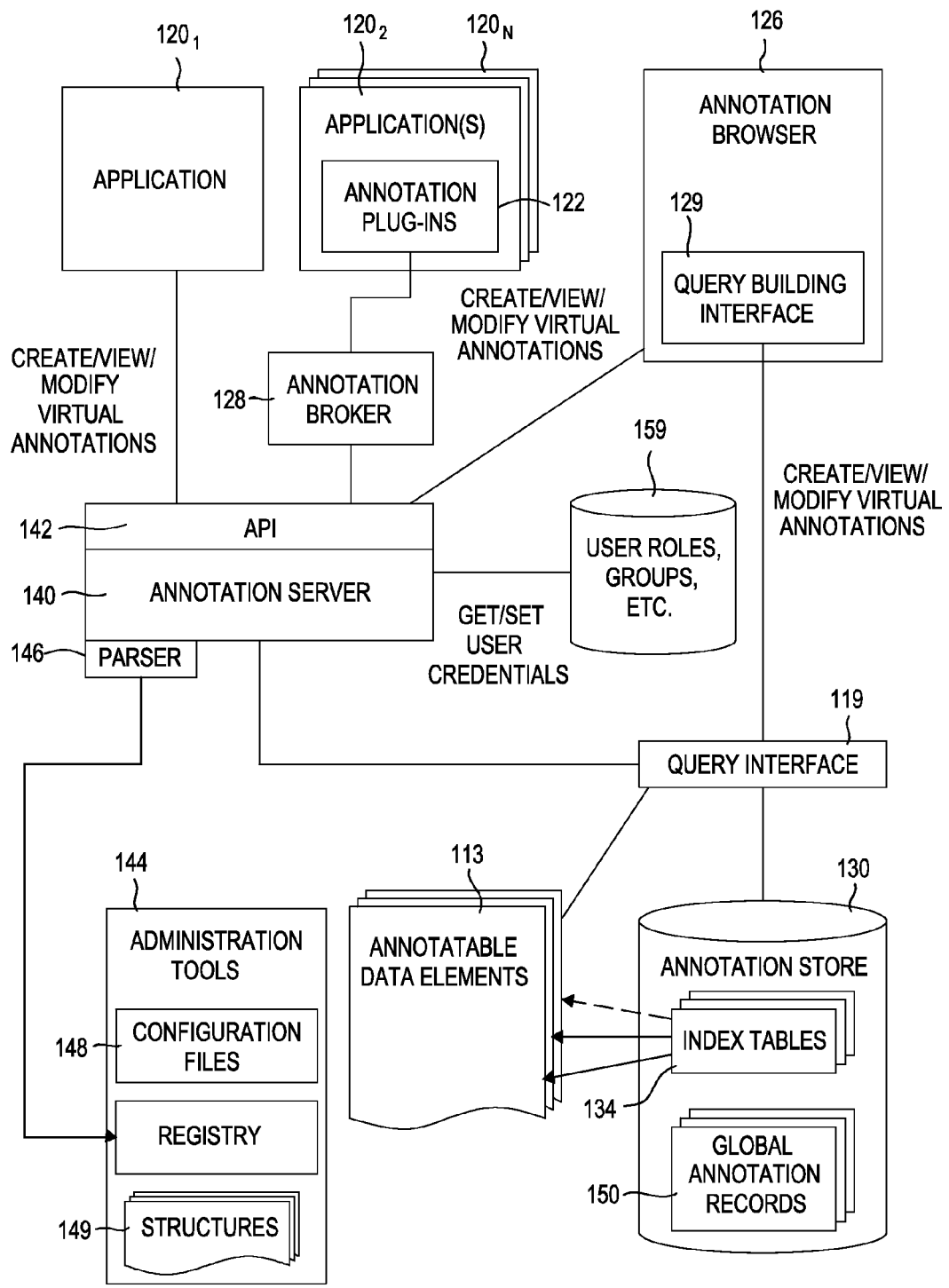
FIG. 3 is a relational component view of an annotation system according to one embodiment of the present invention.

FIG. 3 illustrates a relational view of the annotation server 140 and various other components of the annotation system, in accordance with one embodiment of the present invention. As previously described, one or more applications 120 (e.g., residing on one or more client computers 102) may communicate with the annotation server 140 either directly (e.g., application 120$_1$) or via the annotation plug-ins 122 and/or annotation broker 128 (e.g., applications 120$_2$-120$_N$), to create or view global annotations anchored to data elements contained in data 121 loaded by the applications 120. As illustrated, in some cases to retrieve global annotations and/or create global annotation records 150, the annotation server 140 may issue queries against the annotation store 130 via a query interface 119.

As illustrated, the annotation broker 128 may serve as an interface between annotation plug-ins 122 for multiple applications and the annotation server 140. For example, the annotation broker 128 may manage messages sent to and from multiple annotation plug-ins and the annotation server (e.g., providing mediation between multiple plug-in components 122 trying to access the annotation server 140 simultaneously). For some embodiments, the annotation broker 128 may be implemented as a Windows Component Object Model (COM) server that provides a standard interface and facilitates access to the annotation server 140 for annotation plug-ins 122 for Windows applications (e.g., Microsoft Internet Explorer, Microsoft Word, Microsoft Excel, Adobe Acrobat, Spotfire, and other Windows applications). In other words, by providing a standard interface to the annotation server 140, the annotation broker 128 may facilitate extension of the annotation system to support new applications 120 through the development of plug-in components written in accordance with its interface.

As illustrated, an annotation browser 126 may allow the creation and viewing application data and annotations, independently of any of the applications 120. For some embodiments, the annotation browser 126 may provide a generalized web-based user interface for viewing structured data content (e.g. application source data that can be accessed directly through queries via the query interface 119), and for creating and viewing annotations on it. Thus, the annotation browser 126 may allow global annotations to be accessed (e.g., searched or queried), independently of the applications 120, enabling full text searching of the annotation data.

For some embodiments, in order to identify annotated data element(s), an index, or set of indexes, that may be used to identify the corresponding annotated data object(s) may be stored with the annotation data. As illustrated, an index obtained from an annotation record may be used to retrieve information from one or more index tables 134 that may be used to identify the annotated data element 113. As user herein, the term data element generally refers to any identifiable data unit (or group of data units) that may be described by a global annotation and to which a global annotation may be anchored. Examples of annotatable data elements include, but are not limited to, data contained in database cells, or groups of cells, selected portions of text, and the like.

Upon retrieving an global annotation record 150 from the annotation store, using the index stored therein, the data element described by the annotation can be found from the information within the annotation record. Conversely annotations for a given data element can be looked up in the annotation store, based on an index or other type value generated from the data element, for example, using a hash function (in some cases, it may be possible for slightly different data elements to generate the same hash value). In any case, the indexes identify corresponding data elements and may be used to query an annotation store for global annotations associated with those data elements.

For some embodiments, the index table 134 may be queried separately to determine if annotations exist for a specified data element, for example, in order to provide an indication (e.g., an icon) in the application program 120 of which data elements have annotations. In other words, the existence of an index for a data element in the index table 134 indicates an annotation has been made for that data object. As will be described in greater detail below, For some embodiments, actual annotations may not be retrieved, however, until a user requests them, for example, by clicking on a corresponding annotation icon with a mouse.

Accessing Global Annotations

Figure 4:
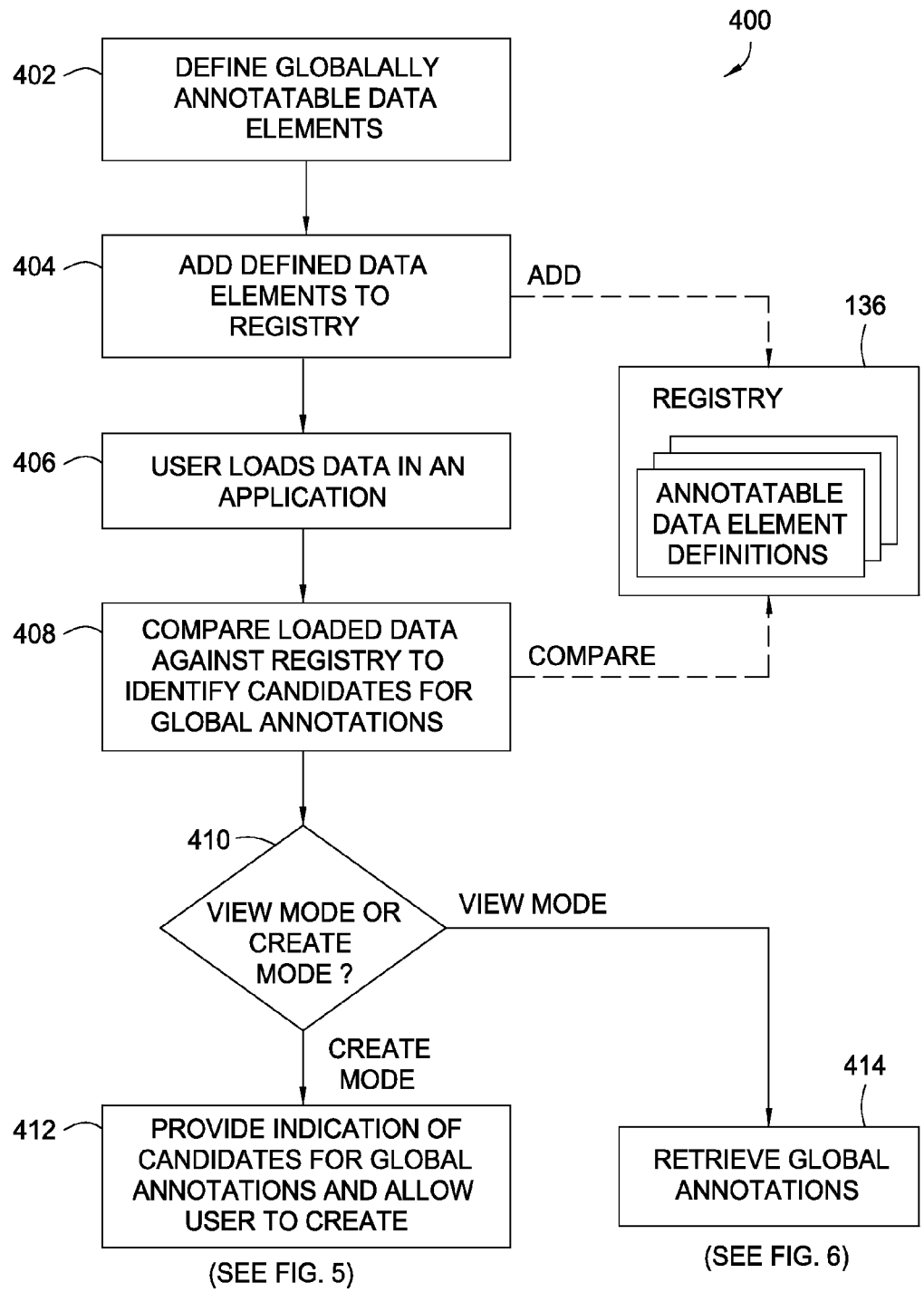
FIG. 4 is a flow diagram of exemplary operations for accessing global annotations according to one embodiment of the present invention.

FIG. 4 is a flow diagram of exemplary operations 400 for accessing global annotations according to one embodiment of the present invention. The operations 400 begin, at step 402, by defining annotatable data elements. The defined annotatable data elements may be added to the registry 136, at step 404. As previously described, for some embodiments, the administrative tools 144 may be used to define and add the annotatable data elements to the registry 136.

At step 406, a user loads data in an application (e.g., by opening a document, spreadsheet, accessing a database, etc.). At step 408, the loaded data is compared against the registry to identify any candidates for global annotations contained (instantiated) in the loaded data. For some embodiments, the registry 136 may contain unique identifiers, such as hash values, generated by applying a hash function to the corresponding data elements. Accordingly, the parser 146 may parse the loaded data by applying the same hash function to different data elements contained therein and comparing the resulting hash values to those contained in the registry 136.

Once it is determined that annotatable data elements exist in the loaded data, global annotations may be created or retrieved for the identified data elements. For some embodiments, the application may be placed in a "create mode" or a "view mode" at step 410. For example, in the create mode, an indication (e.g. by highlighting) of the data elements that are candidates for global annotations may be provided and the user may be allowed to create global annotations for those data elements, at step 412. In the view mode, any global annotations previously created for those data elements may be retrieved, at step 414.

Creating Annotations

Figure 5:
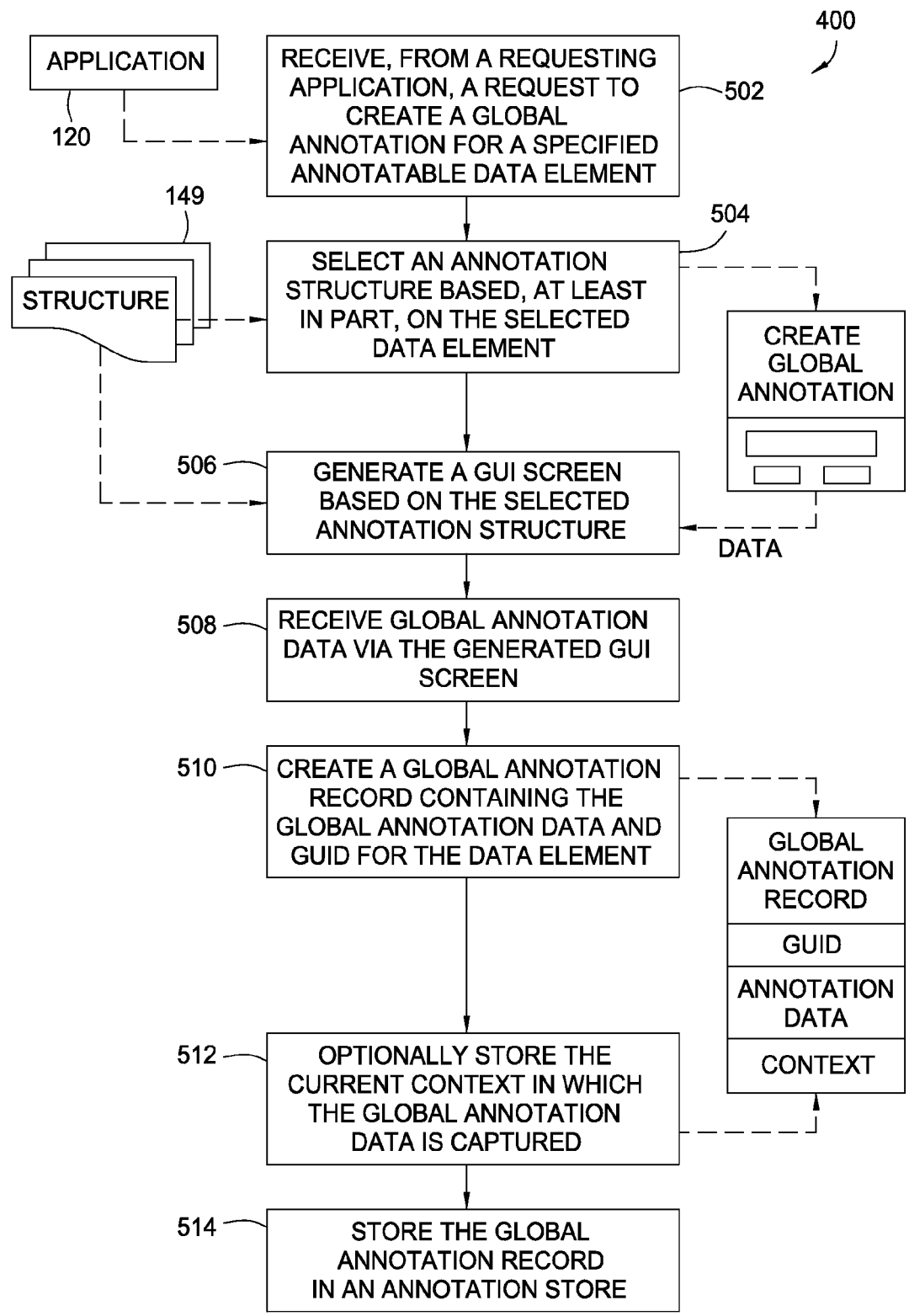
FIG. 5 is a flow diagram of exemplary operations for creating global annotations according to one embodiment of the present invention.
Figure 7A:
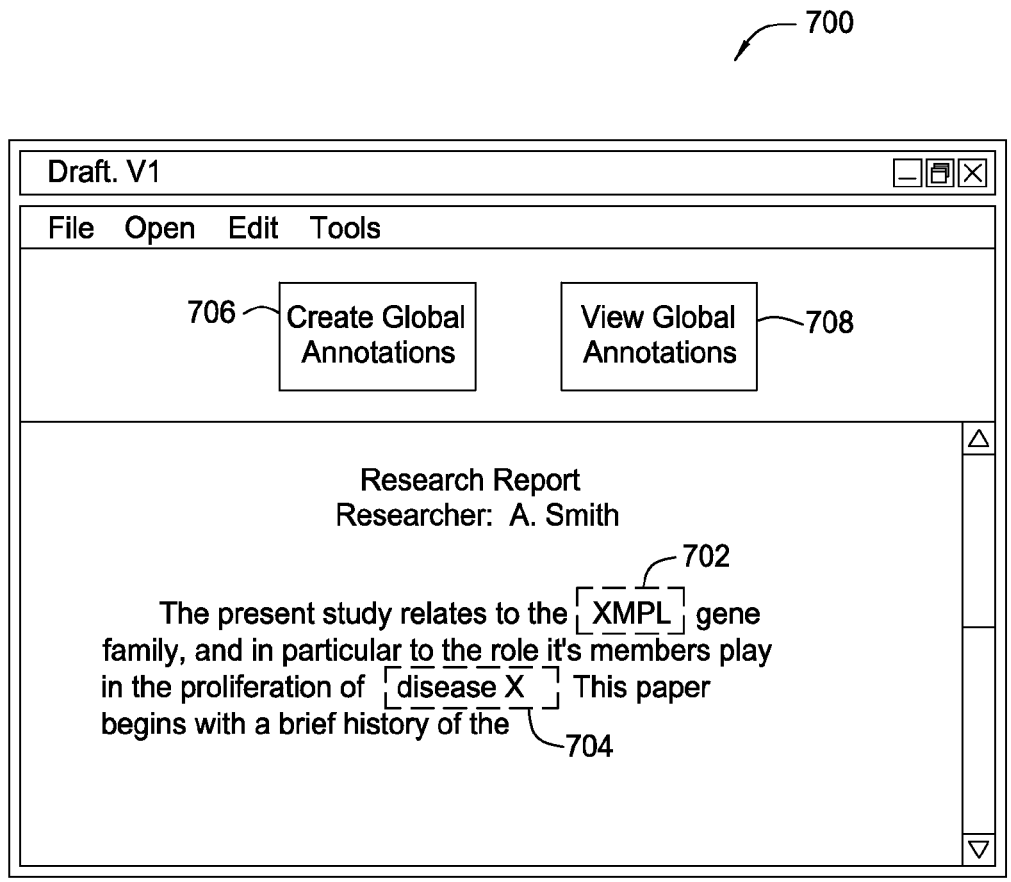
FIGS. 7A-7E illustrate exemplary graphical user interface (GUI) screens according to one embodiment of the present invention.

FIG. 5 is a flow diagram of exemplary operations 500 for creating global annotations, for example, that may be performed in the create mode. The operations 500 begin, at step 502, by receiving from a requesting application 120 (possibly via a plug-in component 122), a request to create a global annotation for an annotatable specified data element (e.g., a data element with an entry in the registry 136). For some embodiments, annotatable data elements may be highlighted in an application (as shown in FIG. 7A described below) and a request to create a global annotation may be sent by selecting the highlighted data element (e.g., double-clicking or right-clicking). While these embodiments contemplate creating annotations from within an application used to load documents containing annotated data elements, for some embodiments, global annotations may be created in a stand-alone application and data elements may be specified directly.

For some embodiments, a common set of annotation data may be captured as global annotations for each type of data element. For other embodiments, however, the data captured as a global annotation may be organized as a set of fields defined in an annotation structure. Different annotation structures (with different sets of fields) may be defined for different type data elements, allowing different types of data to be captured as annotations for different types of data elements. The selection and use of such annotation structures is described in detail in the previously referenced co-pending application Ser. No. 10/600,014, entitled "Universal Annotation Management System." As described therein, for some embodiments, certain annotation structures may be associated with users operating in a certain type of role, thus allowing different users to create different types of annotations.

At step 504, an annotation structure is selected based, at least in part, on the selected data element (and possibly the role of the user creating the annotation). For some embodiments, however, there may only be one annotation structure used for all global annotations. At step 506, a graphical user interface (GUI) screen is generated based on the selected annotation structure. At step 508, global annotation data is received, via the generated GUI screen and, at step 510, a global annotation record containing the annotation data and a unique identifier (e.g., GUID) for the data element is created.

In some cases, it may be desirable for a user to be able to determine the context in which the global annotation was created. For example, the user may wish to access the document (or other type data source) that contained the annotated data element in order to gather other information (view other data contained therein), possibly in order to determine if the annotation is still valid. Therefore, at step 512, the context in which the annotation data has been captured is optionally stored, for example, as a link to the loaded data (document) containing the annotated data element at the time the global annotation was created. At step 514, the annotation record is stored in the annotation store 130.

Retrieving Annotations

Once created, because the global annotations are anchored to the data elements they describe, they may be retrieved from any application loading data that contains an annotated data element. While not discussed in detail below, it should be understood that for some embodiments, global annotations may be retrieved and/or viewed on a "per family" basis, which may facilitate retrieval and viewing, particularly when or if the number of global annotations grows substantially over time. For example, a user may be presented with some type of interface allowing the user to specify a particular family or families of data elements whose global annotations are to retrieve and/or view.

Figure 6:
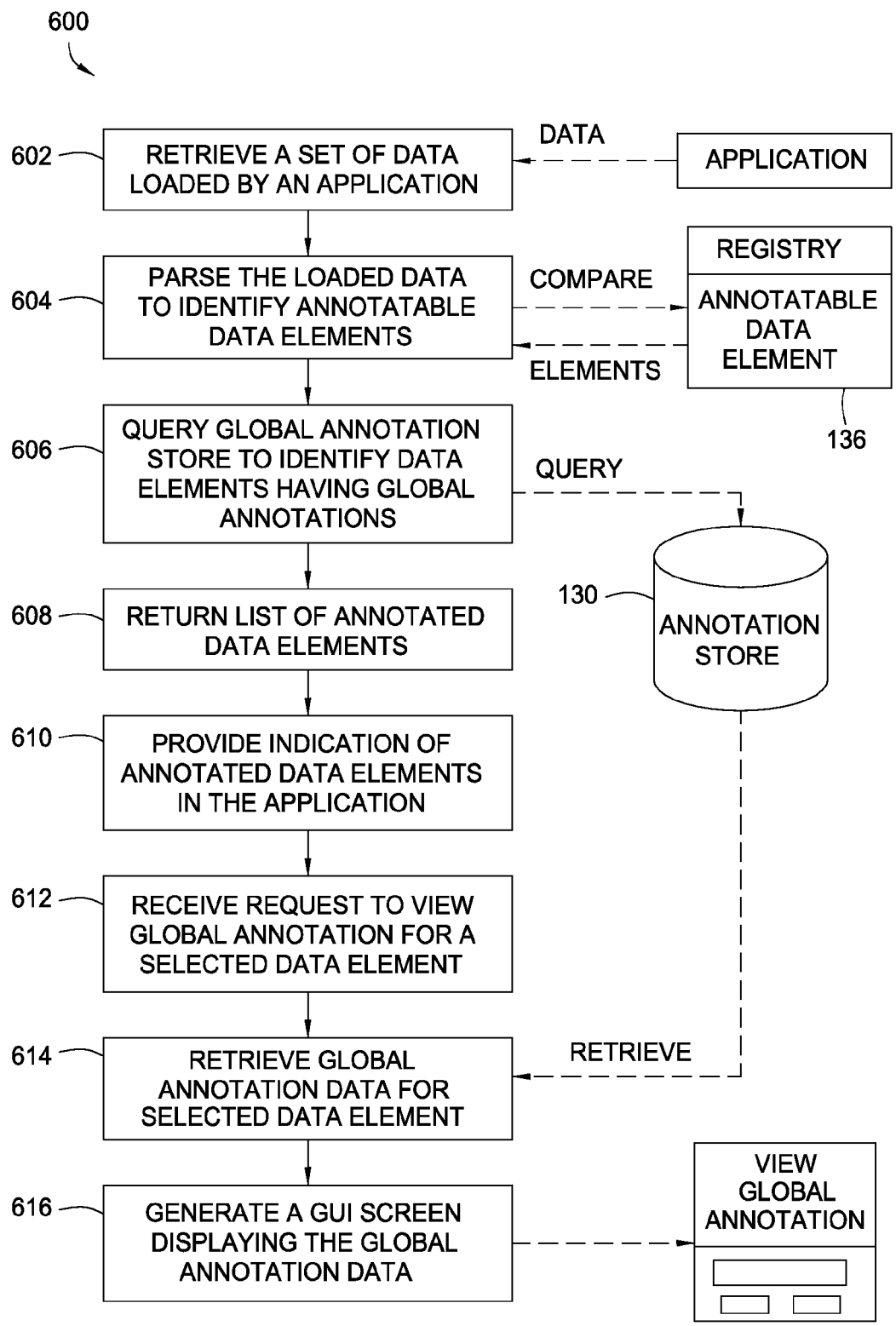
FIG. 6 is a flow diagram of exemplary operations for retrieving and viewing global annotations according to one embodiment of the present invention.

FIG. 6 is a flow diagram of exemplary operations 600 for retrieving and viewing global annotations. The operations 600 begin, at step 602, by retrieving a set of data loaded by an application 120. At step 604, the loaded data is parsed to identify annotatable data elements contained therein (e.g., as previously described with reference to step 408 of FIG. 4). Once the annotatable data elements are identified, the annotation store 130 may be queried, at step 606, to identify which (if any) of the data elements actually have corresponding global annotations anchored thereto.

Based on results of this query (which may return a set of GUIDs for global annotation anchored to the identified data elements), a list of annotated data elements may be returned to the application 120, at step 608, which may then provide an indication of annotated data elements, at step 610. At step 612, a request to view a global annotation for a selected data object is received and, at step 614, the global annotation data is retrieved (e.g., from the annotation store 130 using the GUID for the selected data element). The annotation data is displayed to the user in a GUI screen generated at step 616.

Figure 7B:
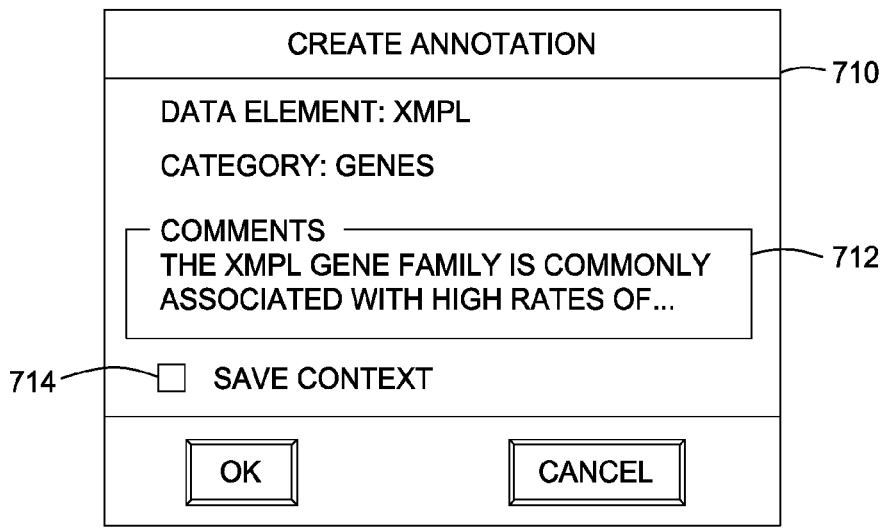
Figure 7C:
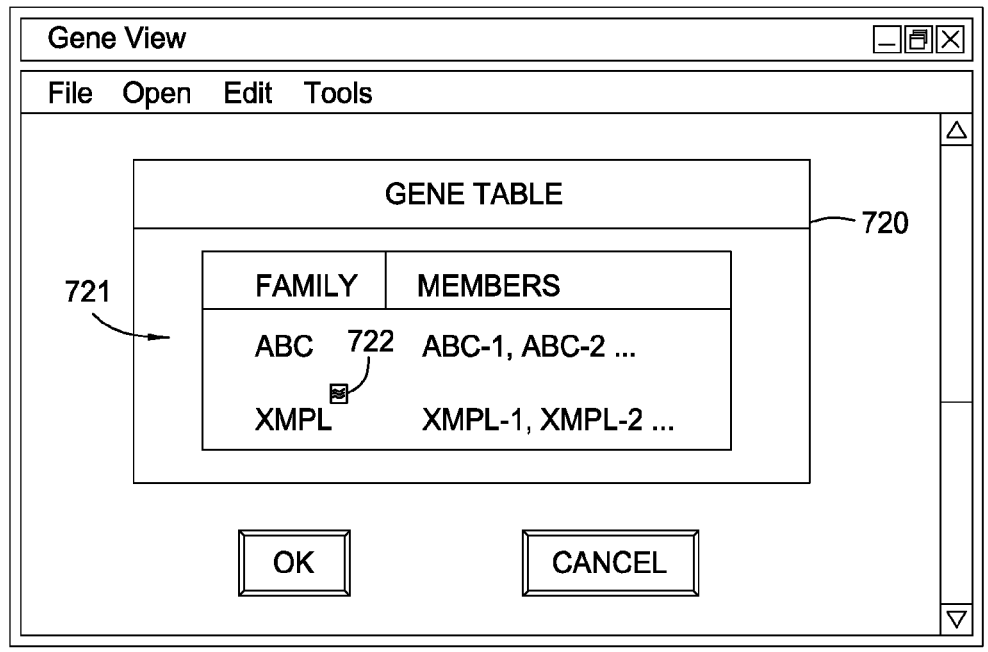
Figure 7D:
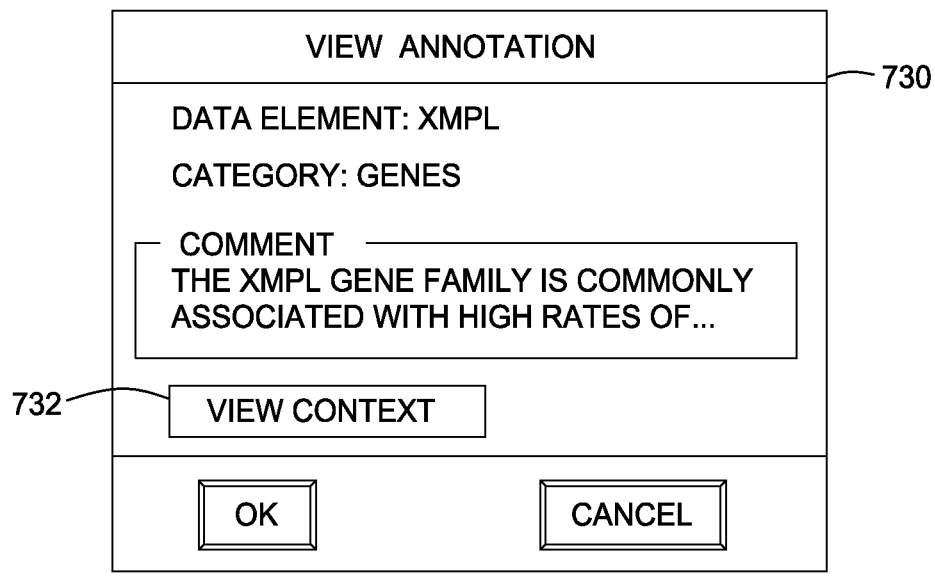
Figure 7E:
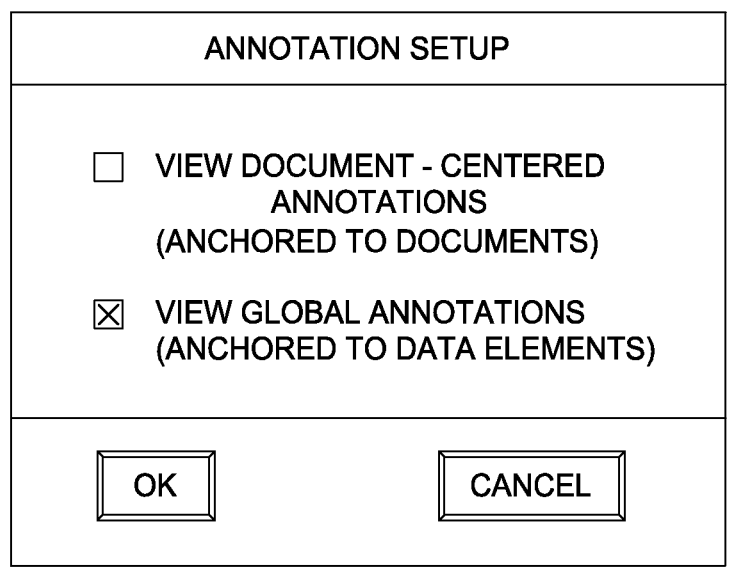

For some embodiments, indications of the existence of annotations for a data element may be provided as an annotation icon displayed proximate the data elements (see FIG. 7D). A request to view a global annotation may then be generated by selecting (e.g., double-clicking) on a corresponding annotation icon. For other embodiments, a list of global annotations for data elements may be returned and displayed, for example, in a separate window. An indication of the annotated data element (e.g., by highlighting) may be provided in response to selecting a listed annotation.

Exemplary Application Examples

FIGS. 7A-7E illustrate exemplary graphical user interface (GUI) screens that illustrate embodiments of some aspects of the present invention. It should be understood, however, that details of the exemplary GUI screens shown in FIGS. 7A-7E are for illustrative purpose, and a wide variety of other type GUI screens providing similar functionality may also be utilized.

FIG. 7A illustrates an exemplary screen 700 of a text editor used to edit a sample research report. For various reasons described above, it may be desirable to capture various information about certain data elements contained in the research report and capture that information as a global annotation, allowing the information to travel with the data and be accessed from other applications instantiating the same data elements (or if the same data elements are instantiated in another document loaded by the same application).

As illustrated, data elements 702 and 704 to which global annotations may be anchored (in this example, gene family and disease names) are indicated, for example by highlighting. For some embodiments, annotatable data elements may be automatically identified and highlighted when data is loaded (e.g., when a document is loaded), for example, by parsing the data and searching the registry as describe above. For some embodiments, different categories of annotatable data elements may exist. Such different categories may be indicated, for example, by different color highlighting facilitating identification of the different categories.

As shown, the screen 700 may include Create and View Global annotations buttons 706 and 708 provided, for example, as part of an annotation plug-in for the text editor, allowing a user to create and view global annotations. For example, in response to selecting one of the annotatable data elements 702 or 704 and pressing the Create Global Annotations button 706, a user may be presented with the GUI screen 710 shown in FIG. 7B.

As illustrated, the GUI screen 710 may identify the data element being annotated (an optional category), and allow the user to enter annotation data in one or more fields, such as the comment field 712. As previously described, for some embodiments the exact fields may be determined by an annotation structure used to generate the GUI screen 720. As illustrated, the GUI screen 710 may also include a check box 714 allowing a user to specify whether a current context in which the annotation is being created should be saved, as previously described. In some cases, the GUI screen 710 may also allow a user to select whether the annotation being created should be global (anchored to the data element) or real (anchored to the application or data source).

Once created, a global annotation for the data element 702 may be viewed from another application. For example, FIG. 7C illustrates an exemplary GUI screen 720 of a database application (illustratively entitled GeneView) that has instantiated the data element 702 in a table 721. As illustrated, an annotation icon 722 may be displayed proximate the data element 702 to indicate the existence of the global annotation. In response to clicking on the annotation icon 722, the previously created global annotation may be displayed in the GUI screen 730 shown in FIG. 7D. As illustrated, the GUI screen 730 may include a button 734 allowing a user to view the context in which the global annotation being viewed was created (i.e., if the context previously saved). For example, pressing the button 734 may access a link to a document containing the data element that was displayed when the global annotation was created, and possibly automatically launching the application used to view the document.

As previously described, for some embodiments, in addition or instead of global annotations anchored to data elements, document-centered annotations anchored to documents or locations therein may also be created and/or viewed from the same application. FIG. 7B illustrates an exemplary GUI screen 710 that may allow a user to select which type of annotations are to be displayed. As previously described, for some embodiments, users may be given more specific viewing control, for example, to specify particular categories of data elements for which global annotations should be viewed. Such control may be desirable as the total number of global annotations corresponding to data elements in any particular set of loaded data may grow large over time.

Conclusion

Global annotations may allow information about data elements to be accessed regardless of the application loading the data containing the annotated data element. As such, global annotations are anchored to the data element and facilitate a more global sharing of information than with more conventional annotations anchored to a particular application or data source.

While the foregoing is directed to embodiments of the present invention, other and further embodiments of the invention may be devised without departing from the basic scope thereof, and the scope thereof is determined by the claims that follow.

What is claimed is:

1. A computer-implemented method for viewing global annotations, comprising:
loading a first set of data into a memory associated with a first application of a first type executing on a processor;
identifying one or more data elements in the first set of data that have been anchored with global annotations by a second application of a second type and not annotated by the first application, wherein each global annotation for a given data element is stored by an annotation system independently from a representation of the given data element used by each of a plurality of software applications to represent the given data element, wherein each of the identified data elements are identified from a registry maintained by the annotation system, and wherein an annotation index, separate from the registry, is provided to store a reference to each data element to which a global annotation has been anchored, based on a unique identifier of each annotated data element;

providing an indication of the identified data elements; and providing an interface, accessible from the first application, allowing a user to view, independently from the second application, a global annotation for a selected one of the identified data elements, wherein at least one of the global annotations was previously created from a second application loading a second set of data containing a data element to which the at least one global annotation is anchored, wherein the global annotation for the selected data element is identified from the annotation index, wherein a format of the global annotation is selected from a plurality of predefined annotation data structures for a plurality of different data element types, and wherein the global annotation created for the selected data element, when viewed, presents annotation content for the global annotation and a context identifying how the selected data element was used in the second set of data when the global annotation was created.

2. The computer-implemented method of claim 1, wherein the interface is accessible by selecting the icon, wherein the indication comprises an icon displayed proximate to the identified data elements.

3. A method for creating global annotations, comprising:

loading a first set of data with a first application of a first type;

identifying a plurality of data elements contained in the first set of data that have been anchored with global annotations by a second application of a second type and not annotated by the first application, wherein each global annotation for a given data element, of the plurality, is stored by an annotation system independently from a representation of the given data element used by each of a plurality of software applications to represent the given data element, wherein the plurality of data elements to which global annotations can be anchored are identified from a registry maintained by the annotation system, and wherein an annotation index, separate from the registry, is provided to store a reference to each data element to which a global annotation has been anchored, based on a unique identifier of each annotated data element;

providing a first interface in the first application allowing a user to create a global annotation for a selected one of the identified data elements, wherein the first interface is configured to capture both annotation content supplied when a global annotation is created for the instance of the selected data element, wherein a format of the global annotation is selected from a plurality of predefined annotation data structures for a plurality of different data element types;

providing a second interface allowing the user to view the global annotation from within the second application when loading a second set of data containing the selected data element for which the global annotation was created, and wherein the global annotation created for the selected data element, when viewed, presents the annotation content; and storing: (i) the global annotation created via the first interface in an annotation store, and (ii) a reference to the selected data element in the annotation index, wherein the global annotation is anchored to the selected data element.

4. A non-transitory computer-readable storage medium containing a program, which, when executed on a processor, performs an operation for creating global annotations, the operation comprising:

loading a first set of data with a first application of a first type;

identifying one or more data elements in the first set of data that have been anchored with global annotations by a second application of a second type and not annotated by the first application, wherein each global annotation for a given data element is stored by an annotation system independently from a representation of the given data element used by each of a plurality of software applications to represent the given data element, wherein each of the identified data elements are identified from a registry maintained by the annotation system, and wherein an annotation index, separate from the registry, is provided to store a reference to each data element to which a global annotation has been anchored, based on a unique identifier of each annotated data element;

providing a first interface in the first application allowing a user to create a global annotation for a selected one of the identified data elements, wherein the first interface is configured to capture both annotation content supplied when a global annotation is created for the instance of the selected data element and a context of the instance of the selected data element, wherein the context identifies how the selected data element is used within the first set of data, wherein a format of the global annotation is selected from a plurality of predefined annotation data structures for a plurality of different data element types;

providing a second interface allowing the user to view the global annotation from within the second application loading a second set of data containing the selected data element for which the global annotation was created, wherein the global annotation for the selected data element is identified from the annotation index, and wherein the global annotation created for the selected data element, when viewed, presents the annotation content and the context identifying how the selected data element is used in the first set of data; and storing: (i) the global annotation created via the first interface in an annotation store, and (ii) a reference to the selected data element in the annotation index, wherein the global annotation is anchored to the selected data element.

5. The non-transitory computer-readable storage medium of claim 4, wherein the global annotation is anchored to the selected data element via association with a global identifier generated for the selected data object, wherein the global identifier is stored in the annotation index.

6. The non-transitory computer-readable storage medium of claim 5, wherein identifying one or more data elements in the loaded data to which global annotations can be anchored comprises:

parsing the loaded data into parsed data elements; and searching the registry of annotatable data elements maintained by the annotation system for matches to the parsed data elements.

7. The non-transitory computer-readable storage medium of claim 6, wherein parsing the loaded data into parsed data elements comprises applying a hashing function to portions of the loaded data.

8. The non-transitory computer-readable storage medium of claim 4, further comprising highlighting, in the loaded data, the identified data elements to which global annotations can be anchored.

9. The non-transitory computer-readable storage medium of claim 8, wherein:

the identified data elements comprise data elements from different categories; and the highlighting comprises highlighting data elements from different categories with different colors.

* * * * *